(12) United States Patent
Mahesh et al.

(10) Patent No.: US 6,891,858 B1
(45) Date of Patent: May 10, 2005

(54) DYNAMIC MODULATION OF MODULATION PROFILES FOR COMMUNICATION CHANNELS IN AN ACCESS NETWORK

(75) Inventors: Harihara Mahesh, San Jose, CA (US); Chrisanto de Jesus Leano, San Jose, CA (US); Syed S. Jafar, San Jose, CA (US); Nozar Azarakhsh, Modesto, CA (US)

(73) Assignee: Cisco Technology Inc., San Jose, CA (US)

( * ) Notice: Subject to any disclaimer, the term of this patent is extended or adjusted under 35 U.S.C. 154(b) by 835 days.

(21) Appl. No.: 09/608,202

(22) Filed: Jun. 30, 2000

(51) Int. Cl.[7] .................................................. H04J 1/00
(52) U.S. Cl. ...................... 370/480; 370/235; 370/333; 714/751; 714/799; 375/232; 375/240.27
(58) Field of Search ................................ 370/203–210, 370/235, 252, 480; 714/1, 4, 6, 774, 750; 375/222, 298, 232–235, 308, 358

(56) References Cited

U.S. PATENT DOCUMENTS

| 5,764,699 A | * | 6/1998 | Needham et al. ............ 375/261 |
| 6,208,663 B1 | * | 3/2001 | Schramm et al. ........... 370/465 |
| 6,341,023 B1 | * | 1/2002 | Puc ............................. 398/79 |
| 6,449,243 B1 | * | 9/2002 | Durvaux et al. ............ 370/204 |
| 6,604,216 B1 | * | 8/2003 | Javerbring et al. ......... 714/751 |
| 6,785,323 B1 | * | 8/2004 | Proctor, Jr. ................. 375/146 |

FOREIGN PATENT DOCUMENTS

| EP | 0930743 | * | 7/1999 | ............ H04L/1/12 |
| WO | WO9715131 | * | 4/1997 | ............ H04L/1/12 |

OTHER PUBLICATIONS

Eriksson et al., Comparison of Link Quality control Stratgies for Packet Data Services in EDGE, Feb. 1999, Ericsson Radio System AB, S–16480, Stockholm Sweden, pp. 938–942.*
Cable Television Labs Inc., Radio Frequency Interface Specification, SP–RFIv1.1–106–001215, Jun. 21, 2000, pp. 23–49.

* cited by examiner

Primary Examiner—Kenneth Vanderpuye
Assistant Examiner—Tri H. Phan
(74) Attorney, Agent, or Firm—Beyer, Weaver & Thomas LLP

(57) ABSTRACT

A technique is disclosed for facilitating communications between a network node and a Head End of an access network. The access network includes a plurality of nodes which communicate with the Head End via at least one upstream channel and at least one downstream channel. The Head End is configured to monitor channel conditions on selected channels of the access network. The Head End is also configured to modify or change the modulation profile used on a selected channel in response to detecting a change in conditions on that particular channel. If the Head End detects that the channel conditions have deteriorated, the Head End may change the modulation profile on the selected channel to one which is better suited for transmitting data on the channel given the current channel conditions. If the Head End detects that the channel conditions have improved, the Head End may change the modulation profile on the selected channel to one which provides for faster data transmission on the selected channel.

74 Claims, 6 Drawing Sheets

DYNAMIC MODULATION OF MODULATION PROFILES FOR COMMUNICATION CHANNELS IN AN ACCESS NETWORK

BACKGROUND OF THE INVENTION

This invention relates to digital computer network technology. More specifically, it relates to methods and apparatus for implementing dynamic adjustment of modulation profiles for communication channels in an access network.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

One type of broadband access technology relates to cable modem networks. A cable modem network or "cable plant" employs cable modems, which are an improvement of conventional PC data modems and provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and convert downstream RF signal to digital form. The conversion is done at a subscriber's facility. At a Cable Modem Termination System ("CMTS"), located at a Head End of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

FIG. 1 is a block diagram of a typical two-way hybrid fiber-coaxial (HFC) cable network system. It shows a Head End 102 (essentially a distribution hub) which can typically service about 40,000 homes. Head End 102 contains a CMTS 104 that is needed when transmitting and receiving data using cable modems. Primary functions of the CMTS include (1) receiving baseband data inputs from external sources 100 and converting the data for transmission over the cable plant (e.g., converting Ethernet or ATM baseband data to data suitable for transmission over the cable system); (2) providing appropriate Media Access Control (MAC) level packet headers for data received by the cable system, and (3) modulating and demodulating the data to and from the cable system.

Head End 102 connects through pairs of fiber optic lines 106 (one line for each direction) to a series of fiber nodes 108. Each Head End can support normally up to 80 fiber nodes. Pre-HFC cable systems used coaxial cables and conventional distribution nodes. Since a single coaxial cable was capable of transmitting data in both directions, one coaxial cable ran between the Head End and each distribution node. In addition, because cable modems were not used, the Head End of pre-HFC cable systems did not contain a CMTS. Returning to FIG. 1, each of the fiber nodes 108 is connected by a coaxial cable 110 to two-way amplifiers or duplex filters 112, which permit certain frequencies to go in one direction and other frequencies to go in the opposite direction (different frequency ranges are used for upstream and downstream paths). Each fiber node 108 can normally service up to 2000 subscribers. Fiber node 108, coaxial cable 110, two-way amplifiers 112, plus distribution amplifiers 114 along with trunk line 116, and subscriber taps, i.e. branch lines 118, make up the coaxial distribution system of an HFC system. Subscriber tap 118 is connected to a cable modem 120. Cable modem 120 is, in turn, connected to a network device 122, such as a subscriber computer.

In order for data to be able to be transmitted effectively over a wide area network such as HFC or other broadband computer networks, a common standard for data transmission is typically adopted by network providers. A commonly used and well known standard for transmission of data or other information over HFC networks is the Data Over Cable System Interface Specification (DOCSIS). The DOCSIS standard has been publicly presented by Cable Television Laboratories, Inc. (Louisville, Colo.), in a document entitled, DOCSIS 1.1 RF Interface Specification (document control number SP-RFIv1.1-I04-000407, Apr. 7, 2000). That document is incorporated herein by reference for all purposes.

Data Communication in Cable Networks

In conventional DOCSIS systems, the CMTS may include a plurality of physically distinct line cards having appropriate hardware for communicating with cable modems in the network. Each line card is typically assigned to a separate DOCSIS domain, which is a collection of downstream and upstream channels for which a single MAC Allocation and Management protocol operates. Typically, each DOCSIS domain includes a single downstream channel and one or more upstream channels. The downstream channel is used by the CMTS to broadcast data to all cable modems (CMs) within that particular domain. Only the CMTS may transmit data on the downstream. In order to allow the cable modems of a particular DOCSIS domain to transmit data to the CMTS, the cable modems share one or more upstream channels within that domain.

Each upstream and downstream channel of the cable network uses a respective modulation profile which is manually configured at the cable Head End by a cable operator or technician. For example, at start-up or initialization of the CMTS, each upstream channel is configured to use a static or fixed modulation profile for receiving communications from the plurality of cable modems using that particular upstream channel. The modulation profile may define a number or parameters to be used by a cable modem when communicating with the CMTS such as, for example, modulation type (e.g. QPSK or QAM), FEC-t byte value (sometimes referred to as FEC strength), preamble, etc. According to conventional techniques, once a particular upstream channel has been configured to utilize a specific modulation profile, the modulation profile for that channel is fixed, and will not change until it is manually re-configured by a cable operator or technician.

The static nature of the modulation profile of each upstream channel becomes problematic, for example, when channel conditions deteriorate. According to conventional techniques, when the channel conditions on a particular upstream channel deteriorate, the modulation profile of the upstream channel must be manually changed in order to compensate for the deteriorating channel conditions. However, by the time the modulation profile of the upstream channel is manually changed, throughput on the upstream channel has already been affected. As a result, cable modems on using the upstream channel may be taken off line by the CMTS.

By way of illustration, it is well known that data can be transmitted much more rapidly using QAM type modulation rather than QPSK type modulation. However, the use of QAM type modulation requires more stringent signal-to-noise ratio (SNR) standards than QPSK type modulation. For example, according to the DOCSIS standard, QAM16 modulation requires a minimum SNR of 25 dB, whereas QPSK modulation only requires a minimum SNR of 15 dB. In conventional HFC networks, it is desirable to use QAM16 modulation on the upstream channels since this modulation type allows for faster data transmission than QPSK. However, as ingress noise increases on an upstream channel using QAM16 modulation, the SNR on that channel begins to decrease. As a result, data being sent from one or more cable modems to the CMTS via the upstream channel may be lost or dropped. As a result, the effective communication rate of the upstream channel is compromised. Moreover, the loss of data on the upstream channel may, in turn, lead to one or more of the cable modems on the upstream channel being taken off-line by the CMTS.

In light of the above, it will be appreciated that there exists a continual need to improve access network configurations (such as, for example, HFC networks) in order to adapt to changing network conditions, and to improve data communication across the access network.

SUMMARY OF THE INVENTION

In accordance with the several embodiments of the present invention, a method and computer program product are disclosed for facilitating communications between a network node and a Head End of an access network. The access network includes a plurality of nodes which communicate with the Head End via at least one upstream channel and at least one downstream channel. The Head End is configured to utilize a first modulation profile for receiving communication signals from at least one network node via a first channel. A change in at least one channel condition on the first channel is then detected. In response to detecting the at least one channel condition change on the first channel, the Head End may be dynamically configured to use a second modulation profile for receiving communication signals on the first channel.

According to specific embodiments, the Head End may be configured to dynamically change the modulation profile used on any given channel in response to changing conditions on that particular channel. For example, according to a specific embodiment, the modulation profile of a specific channel may be dynamically changed in response to detecting an increase or decrease in the signal-to-noise ratio value on that channel. According to an alternate embodiment, the modulation profile of a particular channel may be dynamically changed in response to detecting a change in the number of corrupted packets received via that channel which can be corrected using Forward Error Correction. According to yet another embodiment, the modulation profile for a particular channel may be dynamically changed in response to detecting a change in the number of the packets received via that channel which cannot be corrected using Forward Error Correction.

An alternate embodiment of the present invention is directed to a system for facilitating communications in an access network. The access network includes a plurality of nodes. The system comprises a Head End in communication with at least a portion of the network nodes. The Head End includes a first interface configured or designed to receive data from at least one network node via a first channel. The Head End includes a demodulation system configured to demodulate, using a first modulation profile, communication signals received from network nodes via the first channel. The Head End is further configured or designed to detect a change in at least one channel condition on the first channel. In response to detecting a change in at least one channel condition on the first channel, the Head End is further configured or designed to dynamically reconfigure the demodulation system to use a second modulation profile for demodulating signals received on the first channel.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

According to a specific embodiment of the present invention, the Head End of an access network such as, for example, an HFC network, continually monitors channel conditions on each of the upstream and/or downstream channels of the access network. When the Head End detects that the channel conditions on a particular channel have deteriorated, the Head End may automatically and dynamically reconfigure that particular channel to utilize a different modulation profile that is better suited for transmitting data in light of the newly detected channel conditions. Similarly, when the Head End detects that the channel conditions of a particular channel have improved, the Head End may reconfigure the channel to use a different modulation profile which takes advantage of the improved channel conditions, and allows for more rapid transmission of data across that channel.

Figure 2:
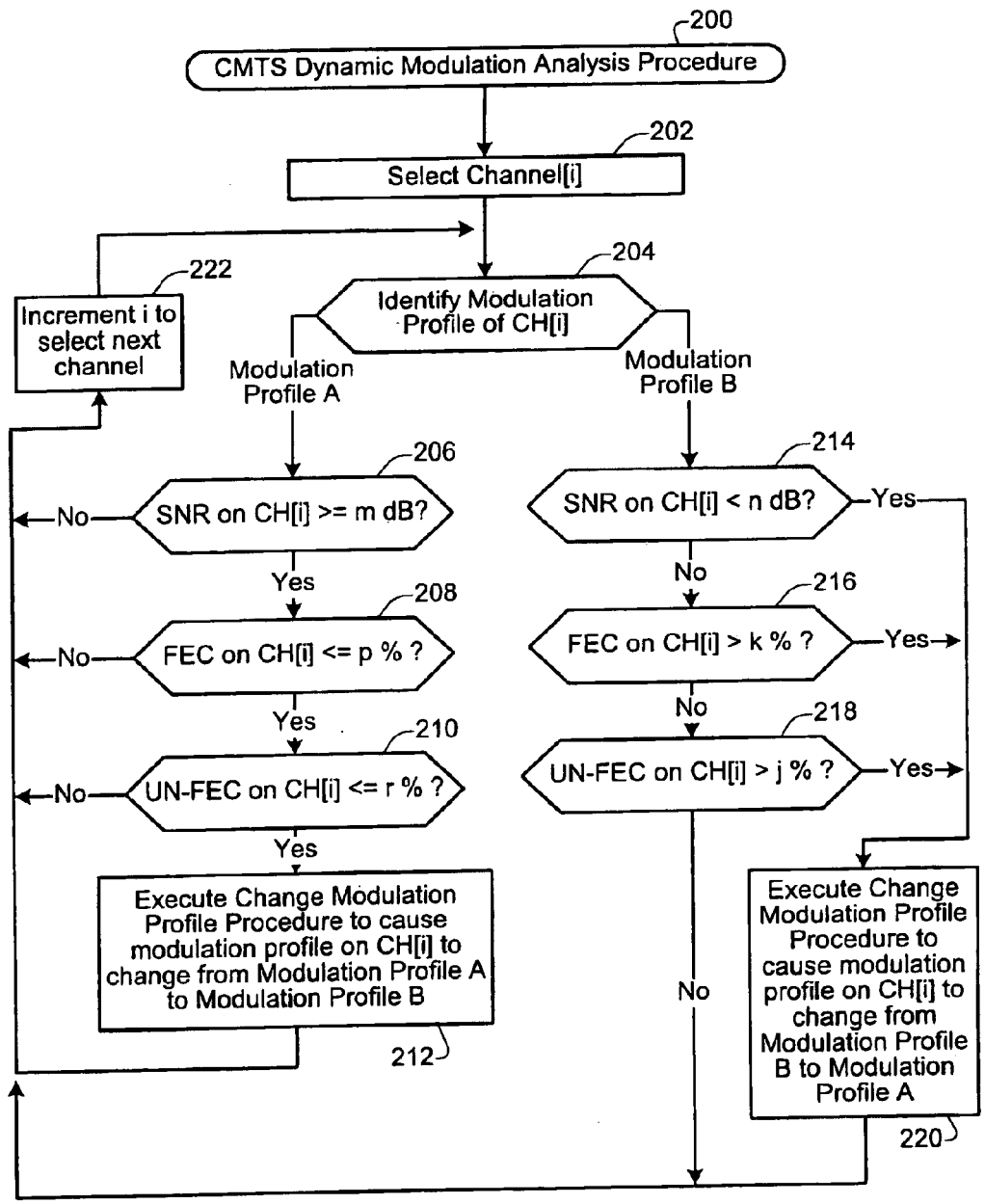
FIG. 2 shows a flow diagram of a CMTS Dynamic Modulation Analysis Procedure 200 in accordance with a specific embodiment of the present invention.

FIG. 2 shows a flow diagram of a CMTS Dynamic Modulation Analysis Procedure 200 in accordance with a specific, embodiment of the present invention. Generally, as described in greater detail below, the CMTS Dynamic Modulation Analysis Procedure monitors channel conditions of selected channels of an access network in order to determine whether there is a change in any channel condition which would necessitate the changing or modifying of the modulation profile used on that particular channel. According to a specific embodiment, the CMTS Dynamic Modulation Analysis Procedure 200 may be automatically initiated about every 15 seconds for each channel or selected channels of the access network. Additionally, According to a specific embodiment, separate runtime instances of the CMTS Dynamic Modulation Analysis Procedure may be initiated for each channel or selected channels of the access network.

Figure 1:
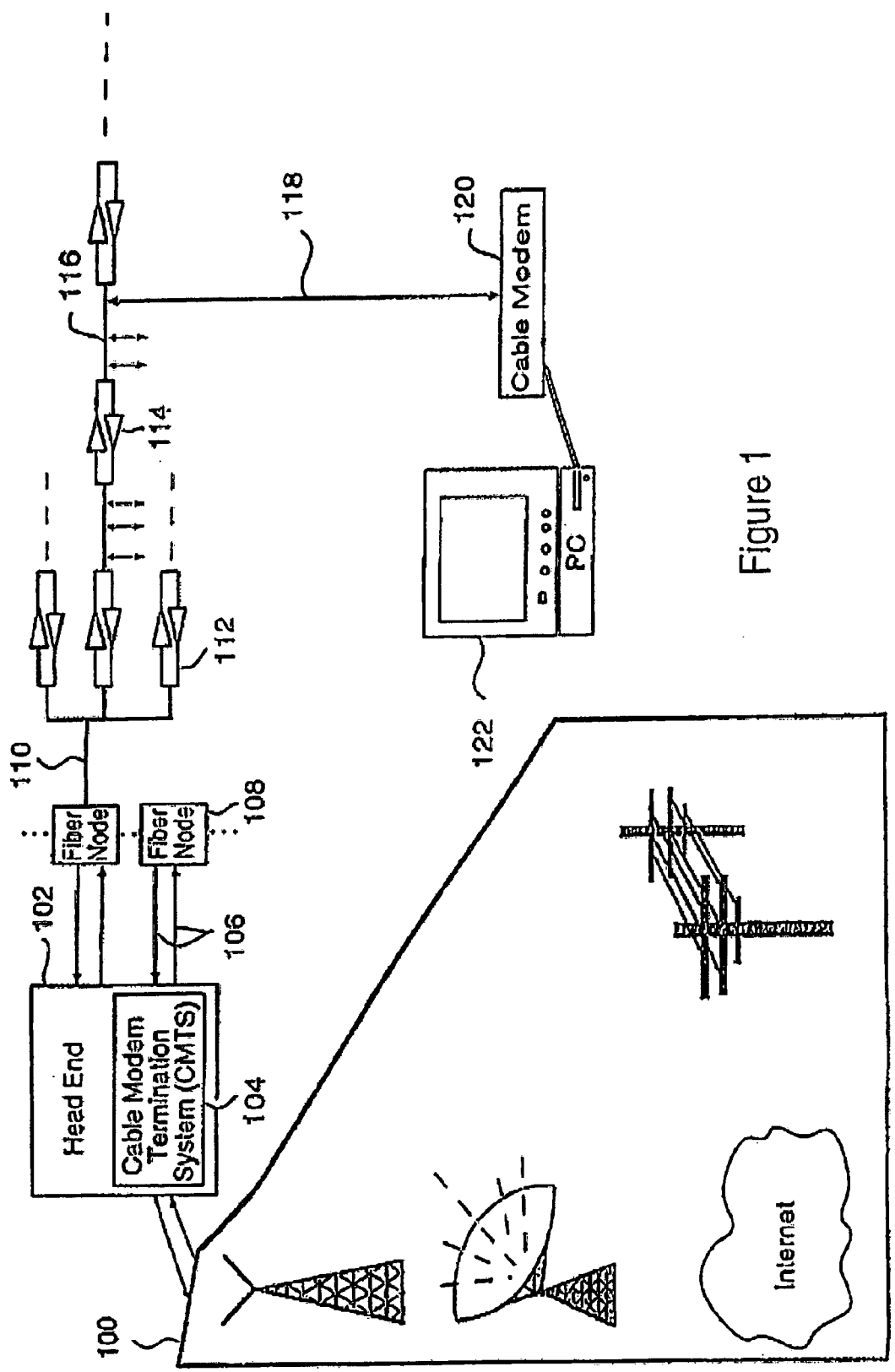
FIG. 1 shows a specific embodiment of a cable network which may be used with the technique of the present invention.

In the example of FIG. 2, it is assumed that the access network is an HFC network such as that described in FIG. 1 of the drawings. Additionally, it is assumed that the cable network of FIG. 2 utilizes the DOCSIS protocol for transmission of data over the HFC network (previously incorporated herein by reference for all purposes).

According to the DOCSIS standard, each upstream and downstream channel of the cable network is initialized using a respective modulation profile that is manually configured at the cable Head End by a cable operator or technician. The initial configuration of the modulation profile for each upstream and downstream channel of the cable network is generally known to one having ordinary skill in the art, and is described in detail in the above-referenced DOCSIS 1.1 RF Interface Specification.

Referring to FIG. 2, at 202 the CMTS selects a particular channel [i] (CH[i]) for analysis. In this example, it is assumed that the selected channel has been initially configured to utilize a specific modulation profile. At 204, the current modulation profile of the selected channel is identified. According to a specific embodiment, the CMTS may identify the current modulation profile of any given channel by consulting a table of current modulation profiles assigned to each or selected channels in the network.

In the example of FIG. 2, it is assumed that there are only 2 modulation profile types which may be used by a network channel, namely a Modulation Profile A and Modulation Profile B. According to a specific implementation the Modulation Profile A corresponds to QPSK type modulation, and the Modulation Profile B corresponds to QAM type modulation. However, it will be appreciated that the technique of the present invention may be modified by one having ordinary skill in the art to include any number of modulation profile types which are available for use in access networks.

Another assumption in the example of FIG. 2 is that the Modulation Profile B allows for faster data transmission over a given channel than Modulation Profile A. For example, as described previously, it is well known that data can be transmitted much more rapidly using QAM type modulation rather than QPSK type modulation. However, according to the DOCSIS standard, the use of QAM type modulation requires more stringent SNR standards than QPSK type modulation. For example, according to the DOCSIS standard, QAM16 modulation requires a minimum SNR of 25 dB, whereas QPSK modulation only requires a minimum SNR of 15 dB.

As shown at 204 of FIG. 2, if the CMTS detects that the selected channel is using Modulation Profile B, it then begins performing an analysis of channel conditions on the selected channel in order to determine whether the modulation profile on the selected channel should be changed.

It will be appreciated that there are a variety of different measurable conditions on any given channel of the access network which may be used as an indicator of that channel's condition and/or transmission quality characteristics. Based upon extensive experimental evidence, the present inventive entity has determined that the desirability to change the modulation profile of a particular channel of an access network substantially depends upon 3 different types of measurable criteria, as described in greater detail below. It will therefore be appreciated that the specific criteria described in this application for determining whether to change the modulation profile of a particular channel of an access network is considered to be inventive and not generally known to one having ordinary skill in the art. Additionally, the specific values or range of values relating to the specific criteria described in this application are also considered to be inventive, and have been derived through extensive experimental evidence.

A first channel condition which is measured or determined is the signal-to-noise (SNR) ratio value of the selected channel. Accordingly, as shown at 214, the SNR value on the selected channel CH[i] is determined and compared to a pre-determined constant n. If the measured SNR value on the selected channel CH[i] is less than a predetermined constant value of n dB, then the CMTS will initiate (220) a Change Modulation Profile Procedure (300, FIG. 3) in order to change the modulation profile of the selected channel.

According to a specific embodiment, the predetermined value n represents the minimum SNR value (in decibels) which may exist on a selected channel that is using a specific modulation profile. Thus, the value n may change depending upon the particular modulation profile that is currently being used on the selected channel. When it is detected that the measured SNR value for the selected channel falls below the minimum SNR value n (which is required to support the current modulation profile on the selected channel), the CMTS will change the modulation profile for the selected channel to one that is better suited for data transmission given the current SNR value on that channel. According to a specific implementation, the value n may be set equal to 25 dB. Thus, referring to block 214, if it is determined that the SNR value for the selected channel is less than 25 dB, the Head End will attempt to change (220) the modulation profile for the selected channel from Modulation Profile B to Modulation Profile A.

Another channel condition on the selected channel which is measured or determined is the value of the FEC factor. For example, as shown in the example of FIG. 2, at 216 a determination is made as to whether the value of the FEC factor on the selected channel is greater than a maximum predetermined value k. According to a specific embodiment, the FEC factor is a value which describes the following ratio:

$$FEC\ Factor = \frac{Correctable\ FEC\ packets\ received}{Total\ number\ of\ packets\ received}, \quad (1)$$

where "Correctable FEC packets received" refers to the number of corrupted packets received via the selected channel (during a predetermined time interval) that can be corrected using Forward Error Correction (FEC), and "Total number of packets received" refers to the total number of packets received on the selected channel during the same predetermined time interval.

Thus, if it is determined (216) that the FEC factor value on the selected channel CH[i] is greater than a maximum allowable value of k %, then the CMTS will initiate (220) the Change Modulation Profile Procedure (300, FIG. 3) to cause the modulation profile of the selected channel to change to a different modulation profile which is better suited for transmitting data on the upstream channel given the current FEC factor. In the example of FIG. 2, the modulation profile for the selected channel will change from Modulation Profile B to Modulation Profile A. However, it will be appreciated that, where other modulation profiles exist, a different modulation profile may be selected which is specifically suited for transmitting data on channels with a relatively high FEC factor value.

Experimental evidence suggests that the predetermined value k may vary depending upon other factors of the modulation profile such as, for example, the FEC-t byte value. According to a specific embodiment, the range of the value of the FEC factor may vary depending on the FEC-t byte value. According to a specific implementation, the FEC-T byte value may range from 0–10 bytes. Using this range, experimental evidence suggests that the FEC factor may vary as shown below in Table 1.

TABLE 1

| FEC-t bytes | FEC Factor (in %) |
|---|---|
| 1 to 3 bytes | 1% |
| 4 to 5 bytes | 2% |
| 6 to 8 bytes | 3% |
| 9 to 10 bytes | 6% |

Thus, according to one implementation, the value k may be selected from a range of values such as, for example, 1–6 percent, depending upon the FEC-t byte value. According to a specific implementation, the value k may be set equal to 3%.

An additional channel condition on the selected channel which is measured or determined is the value of the UNFEC factor. For example, as shown in the example of FIG. 2, at 218 a determination is made as to whether the value of the UNFEC factor on the selected channel is greater than a maximum predetermined value j. According to a specific embodiment, the UNFEC factor is a value which describes the following ratio:

$$UNFEC\ Factor = \frac{Uncorrectable\ FEC\ packets\ received}{Total\ number\ of\ packets\ received}, \quad (2)$$

where "Uncorrectable FEC packets received" refers to the number of corrupted packets received via the selected channel (during a predetermined time interval) that can not be corrected using Forward Error Correction (FEC), and "Total number of packets received" refers to the total number of packets received on the selected channel during the same predetermined time interval.

Thus, if it is determined (218) that the UNFEC factor value on the selected channel CH[i] is greater than a maximum allowable value of j %, then the CMTS will initiate (220) the Change Modulation Profile Procedure (300, FIG. 3) to cause the modulation profile of the selected channel to change to a different modulation profile which is better suited for transmitting data on the upstream channel given the current UNFEC factor. In the example of FIG. 2, the modulation profile for the selected channel will change from Modulation Profile B to Modulation Profile A. However, it will be appreciated that, where other modulation profiles exist, a different modulation profile may be selected which is specifically suited for transmitting data on channels with a relatively high UNFEC factor value. Experimental evidence suggests that the predetermined value j may vary according to the types of modulation profiles to be used. According to a specific embodiment where the access network corresponds to an HFC network using the DOCSIS standard for transmission, the predetermined value j may be set equal to 1 percent.

In the event that the channel conditions on CH[i] do not satisfy any of the criteria set forth in blocks 214, 216, and 218, then it may be concluded that the current conditions on channel[i] are adequate to support the current modulation profile of the channel (e.g. Modulation Profile B), and therefore, no change of the modulation profile on CH[i] will be implemented. Thereafter, the CMTS Dynamic Modulation Analysis Procedure will proceed to select (222) the next channel for analysis.

Returning to block 204 or FIG. 2, if the CMTS detects that the selected channel is using Modulation Profile A, it then begins performing an analysis of channel conditions on the selected channel CH[i] in order to determine whether the modulation profile on the selected channel should be changed.

As described previously, a first channel condition which is measured or determined is the signal-to-noise (SNR) ratio value of the selected channel. Accordingly, as shown at 206, the SNR value on the selected channel CH[i] is determined and compared to a pre-determined constant m. According to a specific embodiment, the predetermined value m represents the minimum SNR value (in decibels) which is required to support the use of a specific modulation profile that allows for faster data transmission on the selected channel. Thus, the value m may change depending upon the particular modulation profile that is desired to be used on the selected channel. According to specific implementations, the predetermined value m may be set equal to a value within the range of 15–25 dB. According to a specific implementation, the value m may be set equal to 25 dB where the Modulation Profile A corresponds to QPSK type modulation, and the Modulation Profile B corresponds to QAM type modulation.

If the measured SNR value on the selected channel CH[i] is not greater than or equal to a predetermined constant value of m dB, then it may be concluded that the current channel conditions are not adequate for supporting a change to Modulation Profile B to thereby achieve faster data transmission on the selected channel. Accordingly, the CMTS will not initiate a change of the current modulation profile on the selected channel, and the CMTS Dynamic Modulation Analysis Procedure will then select (222) a next channel for analysis.

Alternatively, when it is detected that the measured SNR value for the selected channel is above the minimum SNR value m, then it is possible that the current channel conditions are adequate for supporting a change to Modulation Profile B to thereby achieve faster data transmission on the selected channel. However, before implementing the modulation profile change on the selected channel, the CMTS Dynamic Modulation Analysis Procedure first checks additional channel condition criteria on the selected channel to ensure that the current channel conditions are adequate for supporting the "improved" modulation profile.

As shown at 208 of FIG. 2, another channel condition on the selected channel which is measured or determined is the value of the FEC factor. More specifically, a determination is made (208) as to whether the value of the FEC factor on the selected channel is less than or equal to a maximum predetermined value p. According to a specific embodiment, the FEC factor value corresponds to a ratio described by equation (1) above.

Thus, if it is determined (208) that the FEC factor value on the selected channel CH[i] is not less than or equal to a maximum allowable value of p %, then it may be concluded that the current channel conditions are not adequate for supporting a change to Modulation Profile B to thereby achieve faster data transmission on the selected channel. Accordingly, the CMTS will not initiate a change of the current modulation profile on the selected channel, and the CMTS Dynamic Modulation Analysis Procedure will then select (222) a next channel for analysis.

Experimental evidence suggests that the predetermined value p may vary depending upon other factors of the modulation profile such as, for example, the FEC-t byte value. This aspect has been previously described in greater detail with respect to the value k corresponding to block 216 of FIG. 3 of the drawings. According to a different implementation, the value p may be set equal to 3%, where the Modulation Profile A corresponds to QPSK type modulation, and the Modulation Profile B corresponds to QAM type modulation.

When it is detected that the measured SNR value for the selected channel is above the minimum SNR value m, and that the value of the FEC factor on the selected channel is less than or equal to a maximum predetermined value p, then it is possible that the current channel conditions are adequate for supporting a change to Modulation Profile B to thereby achieve faster data transmission on the selected channel. However, before implementing the modulation profile change on the selected channel, the CMTS Dynamic Modulation Analysis Procedure may check additional channel condition criteria on the selected channel to ensure that the current channel conditions are adequate for supporting the new modulation profile.

As shown at 210 of FIG. 2, another channel condition on the selected channel which is measured or determined is the value of the UNFEC factor. More specifically, a determination is made (210) as to whether the value of the UNFEC factor on the selected channel is less than or equal to a maximum predetermined value r. According to a specific embodiment, the UNFEC factor value corresponds to a ratio described by equation (2) above.

Thus, if it is determined (210) that the UNFEC factor value on the selected channel CH[i] is not less than or equal to a maximum allowable value of r %, then it may be concluded that the current channel conditions are not adequate for supporting a change to Modulation Profile B to thereby achieve faster data transmission on the selected channel. Accordingly, the CMTS will not initiate a change of the current modulation profile on the selected channel, and the CMTS Dynamic Modulation Analysis Procedure will then select (222) a next channel for analysis.

Experimental evidence suggests that the predetermined value r may vary according to the types of modulation profiles to be used. According to a specific embodiment, the value r may be set equal to 1%, where the Modulation Profile A corresponds to QPSK type modulation, and the Modulation Profile B corresponds to QAM type modulation.

In the event that the channel conditions on CH[i] do satisfy all of the criteria set forth in blocks 206, 208, and 210, then it may be concluded that the current conditions on channel[i] are adequate to support the new modulation profile (e.g. Modulation Profile B) which will result in faster data transmission on the selected channel. Accordingly, the CMTS will initiate (212) a Change Modulation Profile Procedure (300, FIG. 3) in order to change the modulation profile of the selected channel from Modulation Profile A to Modulation Profile B. According to a specific implementation, Modulation Profile A corresponds to QPSK type modulation, and Modulation Profile B corresponds to QAM type modulation. Thereafter, the CMTS Dynamic Modulation Analysis Procedure will proceed to select (222) the next channel for analysis.

Figure 3:
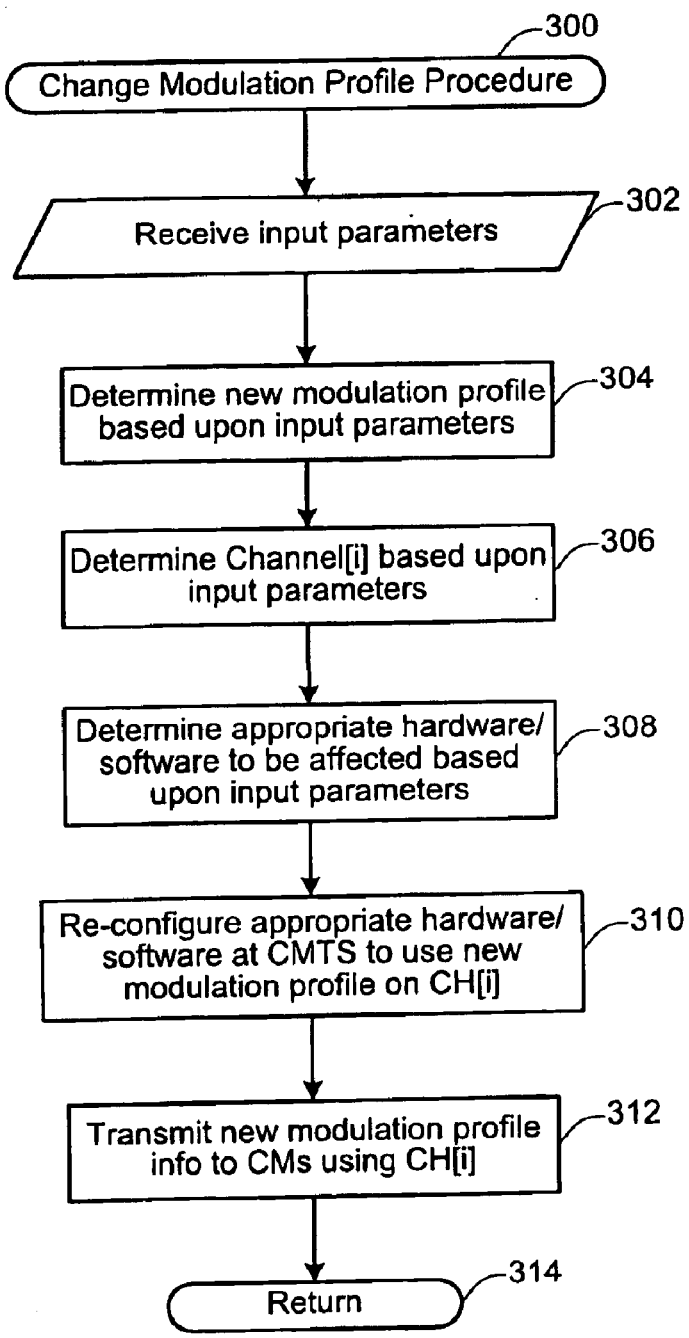
FIG. 3 shows a flow diagram of a Change Modulation Profile Procedure 300 in accordance with a specific embodiment of the present invention.

FIG. 3 shows a flow diagram of a Change Modulation Profile Procedure 300 in accordance with a specific embodiment of the present invention. The Change Modulation Profile Procedure 300 may be implemented at the Head End in order to change the modulation profile of a selected upstream or downstream channels of an access network. In the example of FIG. 3, the Change Modulation Profile Procedure 300 is implemented at the CMTS of a cable network.

When initiating the Change Modulation Profile Procedure 300, the CMTS may provide (302) a number of input parameters to be used for implementing the modulation profile change such as, for example, the new modulation profile to be used, the identity of the selected channel to be affected, etc. After receiving the input parameters, the Change Modulation Profile Procedure may then analyze the input parameters to determine (304) the new modulation profile to be used, and to determine (306) the particular channel CH[i] for which the modulation profile is to be changed. Thereafter, the Change Modulation Profile Procedure may then determine (308) the appropriate hardware and/or software of the CMTS to be affected for implementing the new modulation profile on the specified channel. Once this has been determined, the Change Modulation Profile Procedure reconfigures (310) the appropriate hardware and/or software at the CMTS in order to implement the new modulation profile on the specified channel.

According to a specific embodiment, the modulation profile for a specific channel may be changed by reconfiguring both the CMTS and any cable modems using that channel to utilize the new modulation profile when communicating with each other via the selected channel. Accordingly, at 312 the CMTS transmits the new modulation profile information to all cable modems which are actively using the specified channel in order to cause those cable modems to begin using the new modulation profile when transmitting or receiving data on the specified channel (as described in FIG. 4). Thereafter, the procedural flow returns (314) to the previous procedure which called the Change Modulation Profile Procedure.

Figure 4:
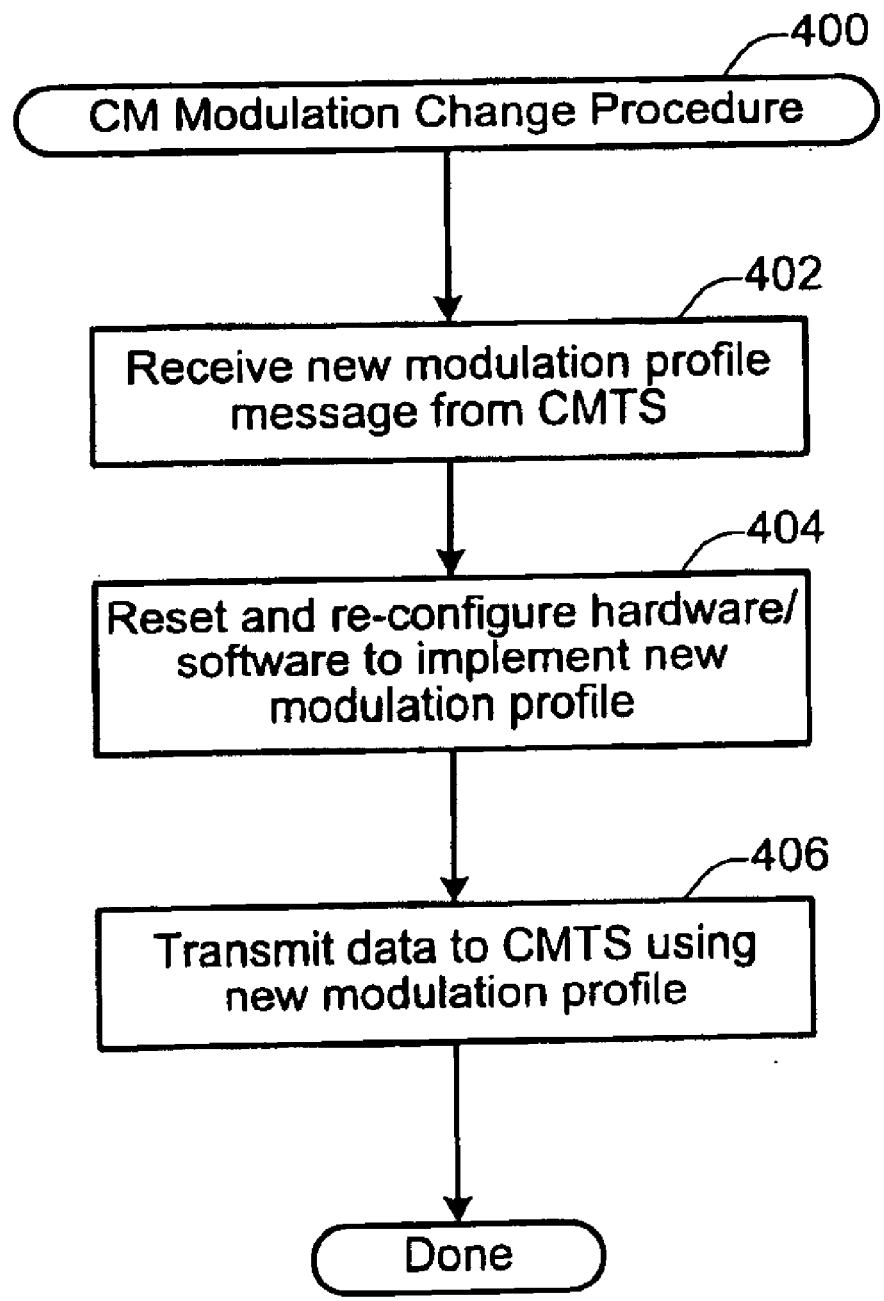
FIG. 4 shows a flow diagram of a Cable Modem Modulation Change Procedure 400 in accordance with a specific embodiment of the present invention.

FIG. 4 shows a flow diagram of a Cable Modem Modulation Change Procedure 400 in accordance with a specific embodiment of the present invention. According to a specific embodiment, the Cable Modem Modulation Change Procedure 400 may be implemented at selected cable modems of the cable network which utilize the particular channel for which the modulation profile is to be changed. It will be appreciated, therefore, that the example of FIG. 4 describes the flow procedure for a specific cable modem that is currently using the selected channel to communicate with the CMTS.

At 402 the cable modem receives a new modulation profile message from the CMTS. According to a specific embodiment, the new modulation profile message is transmitted by the CMTS at block 312 of the Change Modulation Profile Procedure 300 of FIG. 3. The new modulation profile message which is received by the cable modem will include instructions for causing the cable modem to change its modulation profile for communicating on the specified channel. Thus, for example, where the specified channel is an upstream channel used by the cable modem to communicate with the CMTS, the new modulation profile message will include instructions to cause the cable modem to automatically change its configuration to use the newly specified modulation profile when transmitting data on the upstream channel to the CMTS. In conventional cable networks, such as those utilizing the DOCSIS standard, each cable modem is configured or designed to be able to configure itself to use a particular modulation profile that is specified by the CMTS. However, in such conventional networks, the modulation profile configuration is only implemented at start-up or initialization of the cable modem. Moreover, in conventional networks, once the cable modem has been configured to utilize a particular modulation profile on a specific upstream channel, that modulation profile remains fixed, regardless of the channel conditions.

In accordance with the technique of the present invention, however, the cable modems of the cable network are able to dynamically reconfigure themselves in response to receiving one or more new modulation profile messages from the CMTS. Thus, as shown at 404 of FIG. 4, once the cable modem receives a new modulation profile message, it resets and/or reconfigures its hardware and/or software to implement the new modulation profile for the specified channel. The reconfiguration of the cable modem may be performed in accordance with conventional techniques commonly known to one having ordinary skill in the art.

After the cable modem has reconfigured itself to utilize the new modulation profile, it may then begin communicating with the CMTS on the specified channel using the new modulation profile. Thus, for example, if the cable modem changes the modulation profile for its current upstream channel, it may then begin transmitting data on the upstream channel to the CMTS using the new modulation profile.

In the context of a cable network, the technique of the present invention allows service providers who are only able to offer marginal channel conditions on one or more upstream channels the ability to deploy a first modulation profile (e.g. QPSK) while the channel conditions remain marginal, and then dynamically switch to a better, more robust modulation profile (e.g. QAM) when the channel conditions improve. The technique of the present invention also allows service providers the ability to switch from a faster data modulation profile (e.g. QAM) to a slower data modulation profile (e.g. QPSK) when channel conditions on one or more channels of the cable plant deteriorate.

CMTS Configurations

Generally, the technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 5:
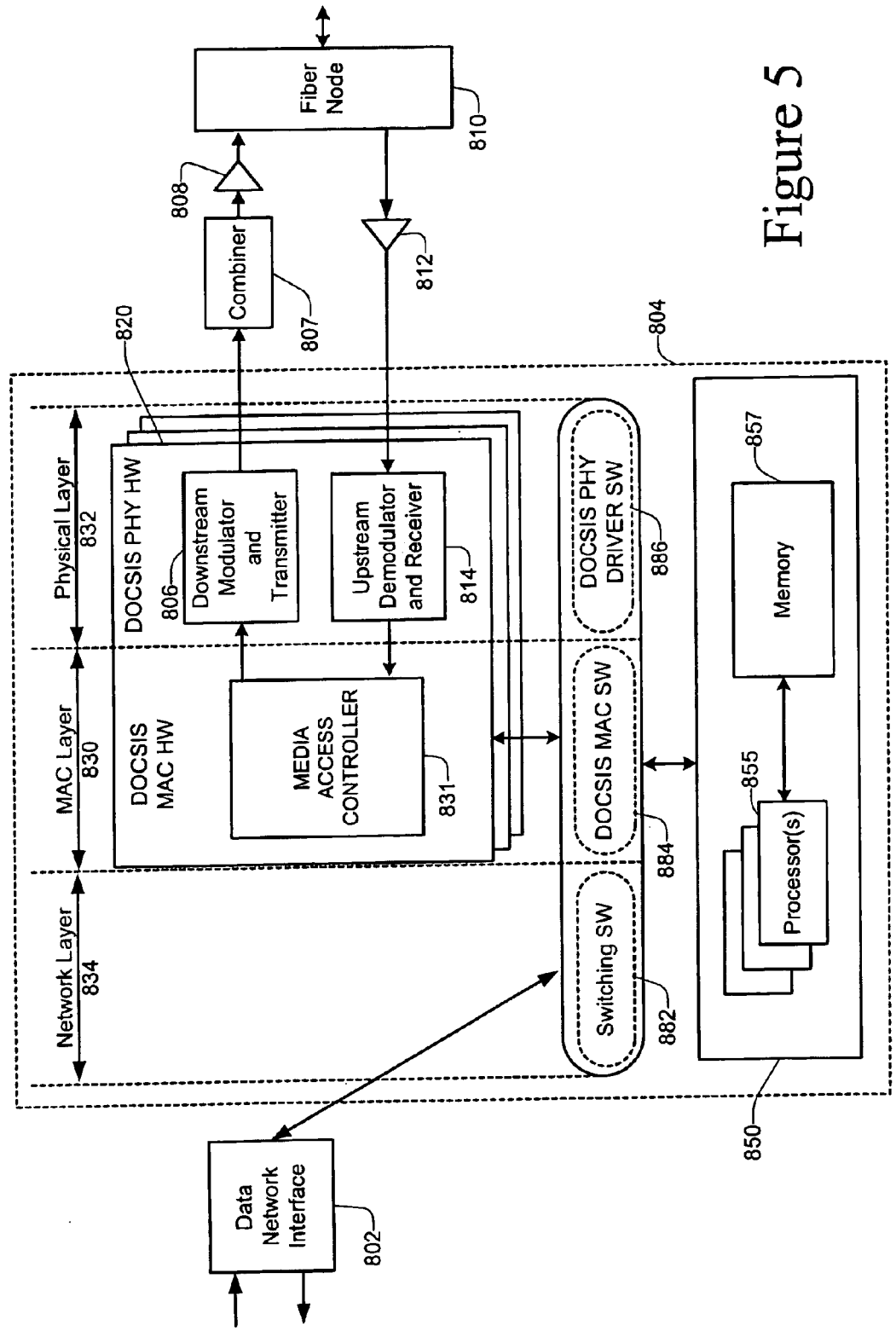
FIG. 5 shows a block diagram of a Cable Modem Termination System (CMTS) which may be used for implementing the technique of the present invention.

FIG. 5 provides an example of some components of a CMTS that may be used to implement certain aspects of this invention. In the specific embodiment as shown in FIG. 5, a CMTS 804 provides functions on three network layers including a physical layer 832, a Media Access Control (MAC) layer 830, and a network layer 834. Generally, the physical layer is responsible for receiving and transmitting RF signals on the cable plant. Hardware portions of the physical layer include a downstream modulator and transmitter 806 and an upstream demodulator and receiver 814. The physical layer also includes software 886 for driving the hardware components of the physical layer.

Upstream optical data signals (packets) arriving via an optical fiber node 810 are converted to electrical signals by a receiver 812. Next, the upstream information packet (RF electrical signals) is demodulated by the demodulator/receiver 814 and then passed to MAC layer block 830. A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems or to the CMTS (if sent upstream) by a MAC layer block 830 in CMTS 804. Note that the cable modems also include MAC addressing components. In the cable modems, these components encapsulate upstream data with a header containing the MAC address of the CMTS.

MAC layer block 830 includes a MAC hardware portion (e.g. MAC controller) 831 and a MAC software portion 884, which together serve the above-described functions. In a preferred embodiment, MAC hardware portion 831 is distinct from the router's general-purpose microprocessor and is dedicated to performing some MAC layer functions.

In specific CMTS configurations, the hardware portions of the physical layer 832 and MAC layer 830 reside on a physical line card 820 within the CMTS. The CMTS may include a plurality of distinct line cards which service particular cable modems in the network. Each line card may be configured to have its own unique hardware portions of the physical layer 832 and MAC layer 830.

After MAC layer block 830 has processed the upstream information, it is then passed to network layer block 834. Network layer block 834 includes switching software 882 for causing the upstream information packet to be switched to an appropriate data network interface on data network interface 802. When a packet is received at the data network interface 802' from an external source, the switching software within network layer 834 passes the packet to MAC layer 830. MAC block 804 then transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown). Data from other services (e.g. television) may be added at a combiner 807. An optical converter 808 converts the modulated RF electrical signals to optical signals that can be received and transmitted via Fiber Node 810 to the cable modem hub.

Note that alternate embodiments of the CMTS (not shown) may not include network layer 834. In such embodiments, a CMTS device may include only a physical layer and a MAC layer, which are responsible for modifying a packet according to the appropriate standard for transmission of information over a cable modem network. The network layer 834 of these alternate embodiments of CMTS devices may be included, for example, as part of a conventional router for a packet-switched network. In a specific embodiment, the network layer of the CMTS is configured as a cable line card coupled to a standard router that includes the physical layer block 832 and MAC layer block 830. Using this type of configuration, the CMTS is able to send and/or receive IP packets to and from the data network interface 802 using switching software block 882.

The data network interface 802 is an interface component between external data sources and the cable system. The external data sources transmit data to the data network interface 802 via, for example, optical fiber, microwave link, satellite link, or through various media The data network interface includes hardware and software for interfacing to various networks such as, for example, Ethernet, ATM, frame relay, etc.

As shown in FIG. 5, CMTS 804 includes a central hardware block 850 including one or more processors 855 and memory 857. These hardware components interact with software and other hardware portions of the various layers within the CMTS. They provide general purpose computing power for much of the software. Memory 857 may include, for example, I/O memory (e.g. buffers), program memory, shared memory, etc. One or more data structures used for implementing the technique of the present invention may reside in such memory. Hardware block 850 may physically reside with the other CMTS components. In one embodiment, the software entities 882, 884, and 886 are implemented as part of a network operating system running on hardware 850. Preferably, at least a part of the dynamic modulation profile change functionality of this invention are implemented in software as part of the operating system. In FIG. 5, such software may be part of MAC layer software 884 and/or the switching software 882, or may be closely associated therewith. Of course, the dynamic modulation profile change logic of the present invention could reside in hardware, software, or some combination of the two.

The procedures employed by the CMTS during registration and pre-registration are preferably performed at the MAC layer of the CMTS logic. Thus, in CMTS 804, most of the registration operations would be performed by the hardware and software provided for MAC layer logic 830.

The operations associated with obtaining an IP address for cable modems are preferably implemented at the network layer level 834. As noted, this may involve the CMTS communicating with a DHCP server (not shown) via data network interface 802, for example.

The upstream and/or downstream dynamic modulation profile change techniques of the present invention may be implemented on various general purpose Cable Modem Termination Systems. In a specific embodiment, the systems of this invention may be specially configured CMTSs such as, for example, specially configured models in the uBR-7200 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 5 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 857) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

It will be appreciated by one having ordinary skill in the art that the technique of the present invention may be implemented in any computer network having a standardized protocol for utilizing a central termination system (e.g. Head End) to schedule time slots for remote stations or nodes on a return (or upstream) channel. In wireless networks, the central termination system may be referred to as a Head End or wireless base station. In satellite networks, the central termination system may be referred to as a master controlling station.

Other Embodiments

While the discussion to this point has focused on upstream and/or downstream dynamic modulation profile change techniques for cable networks, the technology of the present invention may be applied to any access or shared-access network having a plurality of hosts or nodes which share at least one channel for communicating with at least one "Head End" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing dynamic modulation profile change capability in a network having at least one traffic handling device (e.g., another switch or router) that provides normal service to a host. In the wireless system (e.g., represented by FIG. 6) the plurality of nodes or hosts corresponds to the plurality of wireless nodes 950 which use at least one shared access channel to communicate with at least one access control system 922 located at the Head End of the wireless system.

Figure 6:
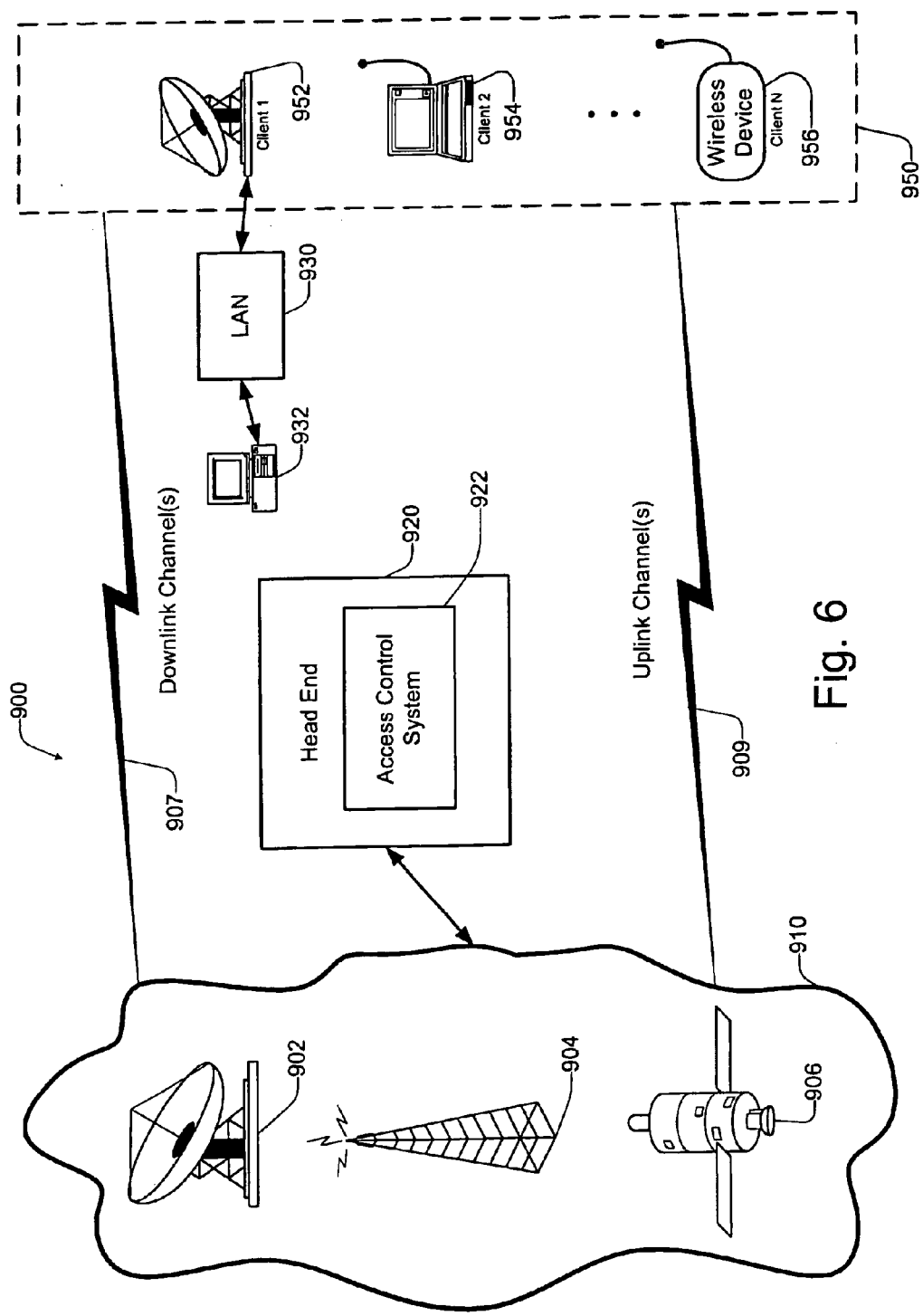
FIG. 6 shows a block diagram of a wireless network which may be used for implementing the technique of the present invention.

As shown in FIG. 6, the wireless system includes a central termination system (or Head End) 920. The Head End includes an access controller or access control system (ACS) 922 which communicates with a plurality of wireless nodes 950, and coordinates access between each of the wireless nodes and the Head End 920. The access controller 922 may include memory and at least one processor. In a specific embodiment, the function of the access controller 922 is analogous to that of the CMTS described above with respect to cable modem networks. It may serve as a router or switch as well.

The Head End 920 communicates with a plurality of wireless nodes 950 via any one of a plurality of wireless transmitting and receiving devices 910. As shown in FIG. 6, for example, the plurality of wireless transmitting and receiving devices 910 may include satellite base stations 902, orbital satellites 906, radio towers 904, etc.

In a specific embodiment which is analogous to that of cable modem networks, the Head End 920 of the wireless computer system communicates with the plurality of nodes 950 via one or more downlink channels 907 and one or more uplink channels 909. Each downlink channel 907 is a broadcast-type channel utilized by the Head End to communicate with an associated group of wireless nodes within the wireless network. The uplink channel 909 is a shared-access channel, which is utilized by a group of wireless nodes (analogous to cable modems) to communicate with the Head End 920. The access controller 922 stores registration parameters for the various nodes that it services. It may also store the IP addresses for nodes that it services.

In a specific embodiment of the present invention, the registration process and information is similar to that of the cable network CMTSs described above. Moreover, the technique of the present invention for dynamic modulation profile change capability over a shared access data network may be implemented in wireless system 900.

The wireless devices or nodes 950 may include any one of a number of wireless transmitting/receiving devices. For example, a satellite dish 952 may be used to communicate with the Head End 920 via the uplink and downlink channels. The satellite dish may, in turn, be connected to a local area network (LAN) 930 which may be further connected to one or more computer systems 932. Another wireless device may be a portable/wireless computer system 954, which is able to transmit and receive information to the Head End via uplink and downlink channels 907 and 909. Other wireless devices 956 may include, for example, wireless telephones, handheld computing devices, etc.

In specific embodiments where the uplink and downlink channels within the wireless system 900 are utilized in a manner similar to that of the upstream and downstream channels of a cable modem network, the above-described dynamic modulation profile change techniques may easily be implemented in wireless system 900 using the detailed description of the present invention provided herein. Moreover, the technique of the present invention may be easily implemented in any computer network which uses shared access channels for communicating between a centralized computing system and one or more remote nodes.

It will be appreciated that the technique of the present invention is not limited to cable networks, and may be applied to any access data network which uses at least one shared access communication channel to communicate between a plurality of nodes in the network and a Head End of the network.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

What is claimed is:

1. A method for facilitating communications between a network node and a Head End of an access network, the access network including a plurality of nodes which communicate with the Head End via at least one upstream channel and at least one downstream channel, the method comprising:

configuring the Head End to utilize a first modulation profile for receiving communication signals from at least one network node via a first channel;

detecting a change in at least one channel condition on the first channel; and dynamically configuring the Head End to use a second modulation profile for receiving communication signals on the first channel, wherein said dynamically configuring is performed in response to the at least one channel condition change being detected on the first channel, and wherein the at least one channel condition chance includes a Forward Error Correction (FEC) factor value change.

2. The method of claim 1 further comprising:

de-modulating, using the first modulation profile, communication signals received on the first channel before the change in the at least one channel condition has been detected; and de-modulating, using the second modulation profile, communication signals received on the first channel after the change in the at least one channel condition has been detected.

3. The method of claim 1 wherein the first channel corresponds to an upstream channel used by at least one network node for transmitting data to the Head End.

4. The method of claim 1 wherein the at least one channel condition change includes a change in the value of a signal-to-noise (SNR) ratio on the first channel.

5. The method of claim 4 wherein said dynamic modulation profile change occurs in response to the signal-to-noise (SNR) ratio value on the first channel decreasing below a predetermined value of n dB.

6. The method of claim 5 wherein the value n is equal to 25 dB.

7. The method of claim 5 wherein the value n is a value selected from the range of 15 dB to 25 dB.

8. The method of claim 5 wherein the first modulation profile includes QAM modulation, and the second modulation profile includes QPSK modulation.

9. The method of claim 4 wherein said dynamic modulation profile change occurs in response to the signal-to-noise (SNR) ratio value on the first channel increasing above a predetermined value of n dB.

10. The method of claim 9 wherein the value n is equal to 25 dB.

11. The method of claim 9 wherein the value n is a value selected from the range of 15 dB to 25 dB.

12. The method of claim 9 wherein the first modulation profile includes QPSK modulation, and the second modulation profile includes QAM modulation.

13. The method of claim 1 wherein the at least one channel condition change includes a change in a first value relating to a number of corrupted packets received via the first channel which can be corrected using Forward Error Correction (FEC).

14. The method of claim 1 wherein said dynamic modulation profile change occurs in response to an FEC factor value increasing above a predetermined value of k percent, wherein the FEC factor value corresponds to a ratio of a number of corrupted packets received via the first channel which can be corrected using Forward Error Correction (FEC) to a total number of packets received via the first channel during a predetermined time interval.

15. The method of claim 14 wherein the value k is equal to 3 percent.

16. The method of claim 14 wherein the value k is a value selected from the range of 1–6 percent.

17. The method of claim 14 wherein the first modulation profile includes QAM modulation, and the second modulation profile includes QPSK modulation.

18. The method of claim 1 wherein said dynamic modulation profile change occurs in response to an FEC factor value decreasing below a predetermined value of k percent, wherein the FEC factor value corresponds to a ratio of a number of corrupted packets received via the first channel which can be corrected using Forward Error Correction (FEC) to a total number of packets received via the first channel during a predetermined time interval.

19. The method of claim 18 wherein the value k is equal to 3 percent.

20. The method of claim 18 wherein the value k is a value selected from the range of 1–6 percent.

21. The method of claim 18 wherein the first modulation profile includes QPSK modulation, and the second modulation profile includes QAM modulation.

22. The method of claim 1 wherein the at least one channel condition change includes a change in a second value relating to a number of corrupted packets received via the first channel which are not able to be corrected using Forward Error Correction.

23. The method of claim 1 further comprising dynamically configuring the first channel to utilize said second modulation profile, wherein said dynamically configuring of the first channel is performed in response to the at least one channel condition change being detected on the first channel.

24. The method of claim 1 further comprising automatically transmitting a modulation profile change message to the at least one network node to thereby cause the network node to use the second modulation profile when transmitting data to the Head End via the first channel.

25. The method of claim 24 further comprising:
responding to the modulation profile change message by dynamically configuring the network node to utilize the second modulation profile when transmitting at least one signal to the Head End via the first channel.

26. The method of claim 1 wherein said access network is a wireless network.

27. The method of claim 1 wherein said access network is a cable network, said plurality of nodes are cable modems, and wherein said Head End comprises a Cable Modem Termination System (CMTS).

28. A method for facilitating communications between a network node and a Head End of an access network, the access network including a plurality of nodes which communicate with the Head End via at least one upstream channel and at least one downstream channel, the method comprising:
configuring the Head End to utilize a first modulation profile for receiving communication signals from at least one network node via a first channel;
detecting a change in at least one channel condition on the first channel; and
dynamically configuring the Head End to use a second modulation profile for receiving communication signals on the first channel, wherein said dynamically configuring is performed in response to the at least one channel condition change being detected on the first channel, wherein said dynamic modulation profile change occurs in response to an UN-FEC factor value increasing above a predetermined value of j percent, wherein the UN-FEC factor value corresponds to a ratio of a number of corrupted packets received via the first channel which can not be corrected using Forward Error Correction to a total number of packets received via the first channel during a predetermined time interval.

29. The method of claim 28 wherein the value j is equal to 1 percent.

30. The method of claim 28 wherein the first modulation profile includes QAM modulation, and the second modulation profile includes QPSK modulation.

31. A method for facilitating communications between a network node and a Head End of an access network, the access network including a plurality of nodes which communicate with the Head End via at least one upstream channel and at least one downstream channel, the method comprising:
configuring the Head End to utilize a first modulation profile for receiving communication signals from at least one network node via a first channel;
detecting a change in at least one channel condition on the first channel; and
dynamically configuring the Head End to use a second modulation profile for receiving communication signals on the first channel, wherein said dynamically configuring is performed in response to the at least one channel condition change being detected on the first channel, wherein said dynamic modulation profile change occurs in response to an UN-FEC factor value decreases below a predetermined value of j percent, wherein the UN-FEC factor value corresponds to a ratio of a number of corrupted packets received via the first channel which can not be corrected using Forward Error Correction to a total number of packets received via the first channel during a predetermined time interval.

32. The method of claim 31 wherein the value j is equal to 1 percent.

33. The method of claim 31 wherein the first modulation profile includes QPSK modulation, and the second modulation profile includes QAM modulation.

34. A method for facilitating communications between a network node and a Head End of an access network, the access network including a plurality of nodes which communicate with the Head End via at least one upstream channel and at least one downstream channel, the method comprising:
configuring the Head End to utilize a first modulation profile for receiving communication signals from at least one network node via a first channel;
detecting a change in at least one channel condition on the first channel; and
dynamically configuring the Head End to use a second modulation profile for receiving communication signals on the first channel, wherein said dynamically configuring is performed in response to the at least one channel condition change being detected on the first channel, wherein said dynamic modulation profile change occurs in response to:

a signal-to-noise (SNR) ratio value on the first channel being above a predetermined value of n dB an FEC factor value being below a predetermined value of k percent, wherein the FEC factor value corresponds to a ratio of a number of corrupted packets received via the first channel which can be corrected using Forward Error Correction (FEC) to a total number of packets received via the first channel during a predetermined time interval; and an UN-FEC factor value being below a predetermined value of j percent, wherein the UN-FEC factor value corresponds to a ratio of a number of corrupted packets received via the first channel which can not be corrected using Forward Error Correction to a total number of packets received via the first channel during a predetermined time interval.

35. A system for facilitating communications in an access network, the access network including a plurality of nodes, the system comprising:

a Head End in communication with at least a portion of the network nodes;

the Head End including a first interface configured or designed to receive data from at least one network node via a first channel;

the Head End including a demodulation system configured to demodulate, using a first modulation profile, communication signals received from network nodes via the first channel;

the Head End being further configured or designed to detect a change in at least one channel condition on the first channel; and the Head End being further configured or designed to dynamically re-configure the demodulation system ['] to use a second modulation profile for demodulating signals received on the first channel, wherein said re-configuring is performed in response to the at least one channel condition change being detected on the first channel, and wherein the at least one channel condition chance includes a Forward Error Correction (FEC) factor value change.

36. The method of claim 35 wherein the first channel corresponds to an upstream channel used by at least one network node for transmitting data to the Head End.

37. The system of claim 35 wherein the at least one channel condition change includes a change in the value of a signal-to-noise (SNR) ratio on the first channel.

38. The system of claim 37 wherein said demodulation system re-configuration occurs in response to the signal-to-noise (SNR) ratio value on the first channel decreasing below a predetermined value of n dB.

39. The system of claim 38 wherein the value n is equal to 25 dB.

40. The system of claim 38 wherein the value n is a value selected from the range of 15 dB to 25 dB.

41. The system of claim 38 wherein the first modulation profile includes QAM modulation, and the second modulation profile includes QPSK modulation.

42. The system of claim 37 wherein said demodulation system re-configuration occurs in response to the signal-to-noise (SNR) ratio value on the first channel increasing above a predetermined value of n dB.

43. The system of claim 42 wherein the value n is equal to 25 dB.

44. The system of claim 42 wherein the value n is a value selected from the range of 15 dB to 25 dB.

45. The system of claim 42 wherein the first modulation profile includes QPSK modulation, and the second modulation profile includes QAM modulation.

46. The system of claim 35 wherein the at least one channel condition change includes a change in a first value relating to a number of corrupted packets received via the first channel which can be corrected using Forward Error Correction (FEC).

47. The system of claim 35 wherein said demodulation system re-configuration occurs in response to an FEC factor value increasing above a predetermined value of k percent, wherein the FEC factor value corresponds to a ratio of a number of corrupted packets received via the first channel which can be corrected using Forward Error Correction (FEC) to a total number of packets received via the first channel during a predetermined time interval.

48. The system of claim 47 wherein the value k is equal to 3 percent.

49. The system of claim 47 wherein the value k is a value selected from the range of 1–6 percent.

50. The system of claim 47 wherein the first modulation profile includes QAM modulation, and the second modulation profile includes QPSK modulation.

51. The system of claim 35 wherein said demodulation system re-configuration occurs in response to an FEC factor value decreasing below a predetermined value of k percent, wherein the FEC factor value corresponds to a ratio of a number of corrupted packets received via the first channel which can be corrected using Forward Error Correction (FEC) to a total number of packets received via the first channel during a predetermined time interval.

52. The system of claim 51 wherein the value k is equal to 3 percent.

53. The system of claim 51 wherein the value k is a value selected from the range of 1–6 percent.

54. The system of claim 51 wherein the first modulation profile includes QPSK modulation, and the second modulation profile includes QAM modulation.

55. The system of claim 35 wherein the at least one channel condition change includes a change in a second value relating to a number of corrupted packets received via the first channel which are not able to be corrected using Forward Error Correction.

56. The system of claim 35 wherein the Head End is configured or designed to dynamically re-configuring the first channel to utilize said second modulation profile, wherein said dynamically re-configuring of the first channel is performed in response to the at least one channel condition change being detected on the first channel.

57. The system of claim 35 further comprising:

a first network node of the plurality of nodes, wherein the first network node communicates with the Head End via the first channel; and wherein the Head End is further configured or designed to automatically transmit a modulation profile change message to the first network node to thereby cause the first network node to use the second modulation profile when transmitting data to the Head End via the first channel.

58. The system of claim 57 where the first network node is configured or designed to respond to the modulation profile change message by dynamically re-configuring itself to utilize the second modulation profile when transmitting at least one signal to the Head End via the first channel.

59. The system of claim 35 wherein said access network is a wireless network.

60. The system of claim 35 wherein said access network is a cable network, said plurality of nodes are cable modems, and wherein said Head End comprises a Cable Modem Termination System (CMTS).

61. A system for facilitating communications in an access network, the access network including a plurality of nodes, the system comprising:
- a Head End in communication with at least a portion of the network nodes;
- the Head End including a first interface configured or designed to receive data from at least one network node via a first channel;
- the Head End including a demodulation system configured to demodulate, using a first modulation profile, communication signals received from network nodes via the first channel;
- the Head End being further configured or designed to detect a change in at least one channel condition on the first channel; and
- the Head End being further configured or designed to dynamically re-configure the demodulation system to use a second modulation profile for demodulating signals received on the first channel, wherein said re-configuring is performed in response to the at least one channel condition change being detected on the first channel, wherein said demodulation system re-configuration occurs in response to an UN-FEC factor value increasing above a predetermined value of j percent, wherein the UN-FEC factor value corresponds to a ratio of a number of corrupted packets received via the first channel which can not be corrected using Forward Error Correction to a total number of packets received via the first channel during a predetermined time interval.

62. The system of claim 61 wherein the value j is equal to 1 percent.

63. The system of claim 61 wherein the first modulation profile includes QAM modulation, and the second modulation profile includes QPSK modulation.

64. A system for facilitating communications in an access network, the access network including a plurality of nodes, the system comprising:
- a Head End in communication with at least a portion of the network nodes;
- the Head End including a first interface configured or designed to receive data from at least one network node via a first channel;
- the Head End including a demodulation system configured to demodulate, using a first modulation profile, communication signals received from network nodes via the first channel;
- the Head End being further configured or designed to detect a change in at least one channel condition on the first channel; and
- the Head End being further configured or designed to dynamically re-configure the demodulation system to use a second modulation profile for demodulating signals received on the first channel, wherein said re-configuring is performed in response to the at least one channel condition change being detected on the first channel, wherein said demodulation system re-configuration occurs in response to an UN-FEC factor value decreases below a predetermined value of j percent, wherein the UN-FEC factor value corresponds to a ratio of a number of corrupted packets received via the first channel which can not be corrected using Forward Error Correction to a total number of packets received via the first channel during a predetermined time interval.

65. The system of claim 64 wherein the value j is equal to 1 percent.

66. The system of claim 64 wherein the first modulation profile includes QPSK modulation, and the second modulation profile includes QAM modulation.

67. A system for facilitating communications in an access network, the access network including a plurality of nodes, the system comprising:
- a Head End in communication with at least a portion of the network nodes;
- the Head End including a first interface configured or designed to receive data from at least one network node via a first channel;
- the Head End including a demodulation system configured to demodulate, using a first modulation profile, communication signals received from network nodes via the first channel;
- the Head End being further configured or designed to detect a change in at least one channel condition on the first channel; and
- the Head End being further configured or designed to dynamically re-configure the demodulation system to use a second modulation profile for demodulating signals received on the first channel, wherein said reconfiguring is performed in response to the at least one channel condition change being detected on the first channel, wherein said demodulation system re-configuration occurs in response to:
  - a signal-to-noise (SNR) ratio value on the first channel being above a predetermined value of n dB
  - an FEC factor value being below a predetermined value of k percent, wherein the FEC factor value corresponds to a ratio of a number of corrupted packets received via the first channel which can be corrected using Forward Error Correction (FEC) to a total number of packets received via the first channel during a predetermined time interval; and
  - an UN-FEC factor value being below a predetermined value of j percent, wherein the UN-FEC factor value corresponds to a ratio of a number of corrupted packets received via the first channel which can not be corrected using Forward Error Correction to a total number of packets received via the first channel during a predetermined time interval.

68. A computer program product for facilitating communications between a network node and a Head End of an access network, the access network including a plurality of nodes which communicate with the Head End via at least one upstream channel and at least one downstream channel, the computer program product comprising:
- a computer usable medium having computer code embodied therein, the computer readable code being executable by a computer system, the computer readable code comprising:
- computer code for receiving a first communication signal from at least one network node via a first channel;
- computer code for de-modulating the first communication signal using a first modulation profile;
- computer code for detecting a change in at least one channel condition on the first channel; and
- computer code for dynamically configuring the Head End to use a second modulation profile for receiving signals on the first channel, wherein said dynamically configuring is performed in response to the at least one channel condition change being detected on the first channel, and wherein the at least one channel condition change includes a Forward Error Correction (FEC) factor value change.

69. The computer program product of claim 68 wherein said dynamic modulation profile change code is implemented in response to the signal-to-noise (SNR) ratio value on the first channel decreasing below a predetermined value of n dB.

70. The computer program product of claim 68 wherein said dynamic modulation profile change code is implemented in response to an FEC factor value increasing above a predetermined value of k percent, wherein the FEC factor value corresponds to a ratio of a number of corrupted packets received via the first channel which can be corrected using Forward Error Correction (FEC) to a total number of packets received via the first channel during a predetermined time interval.

71. The computer program product of claim 68 further comprising computer code for automatically transmitting a modulation profile change message to the at least one network node to thereby cause the network node to use the second modulation profile when transmitting data to the Head End via the first channel.

72. A computer program product for facilitating communications between a network node and a Head End of an access network, the access network including a plurality of nodes which communicate with the Head End via at least one upstream channel and at least one downstream channel, the computer program product comprising:
  a computer usable medium having computer code embodied therein, the computer readable code being executable by a computer system, the computer readable code comprising:
  computer code for receiving a first communication signal from at least one network node via a first channel;
  computer code for de-modulating the first communication signal using a first modulation profile;
  computer code for detecting a change in at least one channel condition on the first channel; and
  computer code for dynamically configuring the Head End to use a second modulation profile for receiving signals on the first channel, wherein said dynamically configuring is performed in response to the at least one channel condition change being detected on the first channel, wherein said dynamic modulation profile change code is implemented in response to an UN-FEC factor value decreases below a predetermined value of j percent, wherein the UN-FEC factor value corresponds to a ratio of a number of corrupted packets received via the first channel which can not be corrected using Forward Error Correction to a total number of packets received via the first channel during a predetermined time interval.

73. A computer program product for facilitating communications between a network node and a Head End of an access network, the access network including a plurality of nodes which communicate with the Head End via at least one upstream channel and at least one downstream channel, the computer program product comprising:
  a computer usable medium having computer code embodied therein, the computer readable code being executable by a computer system, the computer readable code comprising:
  computer code for receiving a first communication signal from at least one network node via a first channel;
  computer code for de-modulating the first communication signal using a first modulation profile;
  computer code for detecting a change in at least one channel condition on the first channel; and
  computer code for dynamically configuring the Head End to use a second modulation profile for receiving signals on the first channel, wherein said dynamically configuring is performed in response to the at least one channel condition change being detected on the first channel, wherein said dynamic modulation profile change code is implemented in response to:
  a signal-to-noise (SNR) ratio value on the first channel being above a predetermined value of n dB
  an FEC factor value being below a predetermined value of k percent, wherein the FEC factor value corresponds to a ratio of a number of corrupted packets received via the first channel which can be corrected using Forward Error Correction (FEC) to a total number of packets received via the first channel during a predetermined time interval; and
  an UN-FEC factor value being below a predetermined value of j percent, wherein the UN-FEC factor value corresponds to a ratio of a number of corrupted packets received via the first channel which can not be corrected using Forward Error Correction to a total number of packets received via the first channel during a predetermined time interval.

74. A system for facilitating communications between a network node and a Head End of an access network, the access network including a plurality of nodes which communicate with the Head End via at least one upstream channel and at least one downstream channel, the system comprising:
  means for receiving a first communication signal from at least one network node via a first channel;
  means for de-modulating the first communication signal using a first modulation profile;
  means for detecting a change in at least one channel condition on the first channel; and
  means for dynamically configuring the Head End to use a second modulation profile for receiving signals on the first channel, wherein said dynamically configuring means is implemented in response to the at least one channel condition change being detected on the first channel, and wherein the at least one channel condition change includes a Forward Error Correction (FEC) factor value change.

* * * * *